(12) United States Patent
Moquin

(10) Patent No.: US 8,687,020 B2
(45) Date of Patent: Apr. 1, 2014

(54) VIRTUAL ENVIRONMENT SIMULATING TRAVEL BY VARIOUS MODES OF TRANSPORTATION

(76) Inventor: Carole Moquin, Candiac (CA)

(*) Notice: Subject to any disclaimer, the term of this patent is extended or adjusted under 35 U.S.C. 154(b) by 701 days.

(21) Appl. No.: 12/267,927

(22) Filed: Nov. 10, 2008

(65) Prior Publication Data

US 2009/0278840 A1 Nov. 12, 2009

Related U.S. Application Data

(60) Provisional application No. 60/986,308, filed on Nov. 8, 2007.

(51) Int. Cl.
*G09G 5/00* (2006.01)
*G06T 1/00* (2006.01)
*B65G 47/00* (2006.01)
*E04H 3/04* (2006.01)
*E04H 3/00* (2006.01)
*H04N 9/31* (2006.01)

(52) U.S. Cl.
USPC ............ 345/632; 345/633; 345/418; 186/35; 186/36; 186/38; 186/52; 348/744

(58) Field of Classification Search
USPC .......................................... 186/35–36, 38, 52
See application file for complete search history.

(56) References Cited

U.S. PATENT DOCUMENTS

| 5,659,323 | A |   | 8/1997  | Taylor            |         |
|-----------|---|---|---------|-------------------|---------|
| 5,917,989 | A | * | 6/1999  | DuCatte, Jr.      | 386/282 |
| 6,441,815 | B1 |  | 8/2002  | McDowell et al.   |         |
| 7,128,705 | B2 |  | 10/2006 | Brendley et al.   |         |
| 2001/0033344 | A1 | | 10/2001 | Grein et al.      |         |
| 2002/0075282 | A1 | | 6/2002  | Vetterli et al.   |         |
| 2004/0113887 | A1 | * | 6/2004 | Pair et al.       | 345/156 |
| 2004/0125044 | A1 | | 7/2004  | Suzuki            |         |

FOREIGN PATENT DOCUMENTS

| CA | 2432238 | 12/2004 |
|----|---------|---------|
| CA | 2557964 | 9/2005  |
| GB | 2313510 | 11/1997 |

OTHER PUBLICATIONS

My Old Kentucky Dinner Train (http://web.archive.org/web/20060815163041/http://www.trailsrus.com/rail/oldky.html).*
Trans-Siberian Railway Panorama, http://en.wikipedia.org/w/index.php?title=Trans-Siberian_Railway_Panorama&oldid=59698325 Jun. 20, 2006 version.*

* cited by examiner

*Primary Examiner* — Xiao M. Wu
*Assistant Examiner* — Yingchun He
(74) *Attorney, Agent, or Firm* — Norton Rose Fulbright Canada LLP

(57) ABSTRACT

A restaurant comprising a virtual reality environment simulating travel by a mode of transportation, such as a train or a boat, to allow individuals seating in the restaurant to have the impression of travelling while enjoying their meals. The restaurant comprises a dining room having side walls, each side wall having a series of windows. Screens are placed on opposed facing sides of the dining room at a distance behind the side walls. A set of projectors is provided for projecting a seamless flow of continuous passing by images of a landscape on the screens. A display control unit synchronizes the projection of the passing by images on the screens in order to create an illusion of travel through the landscape when viewed through the windows in the side walls.

13 Claims, 4 Drawing Sheets

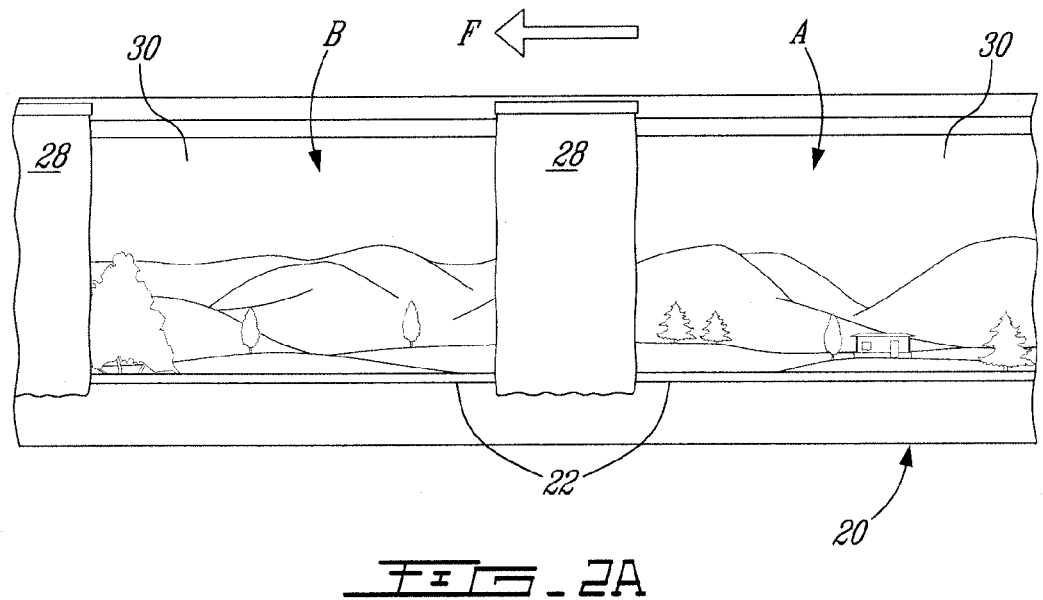
FIG_2A
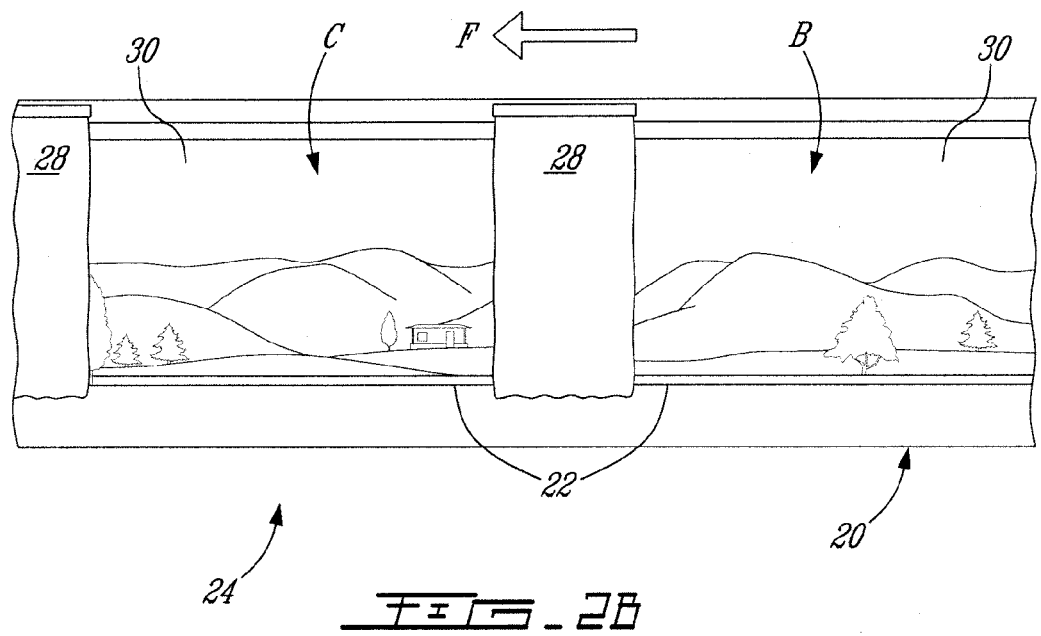
FIG_2B

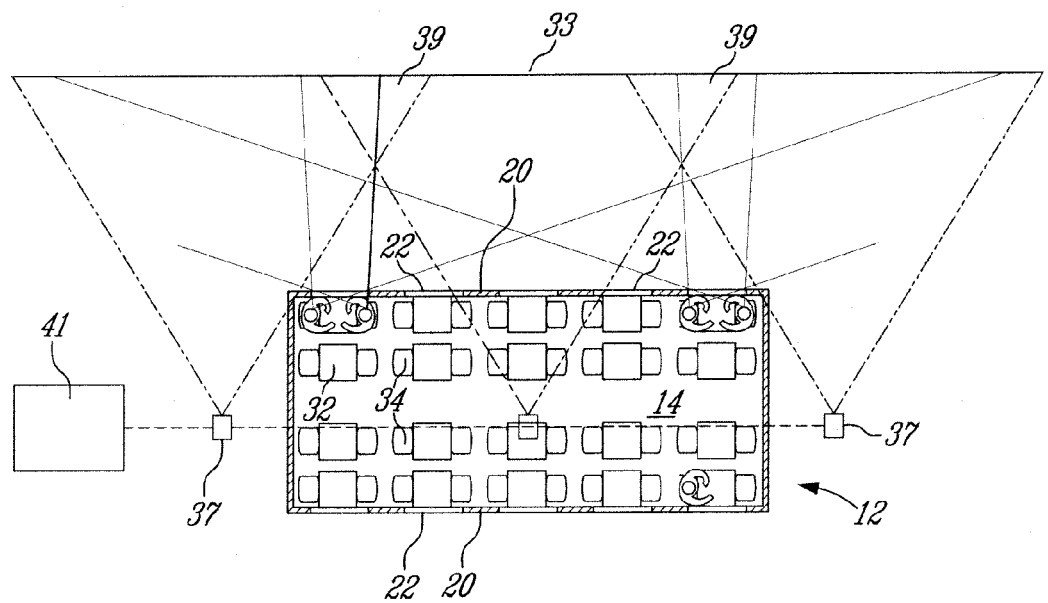
FIG_3
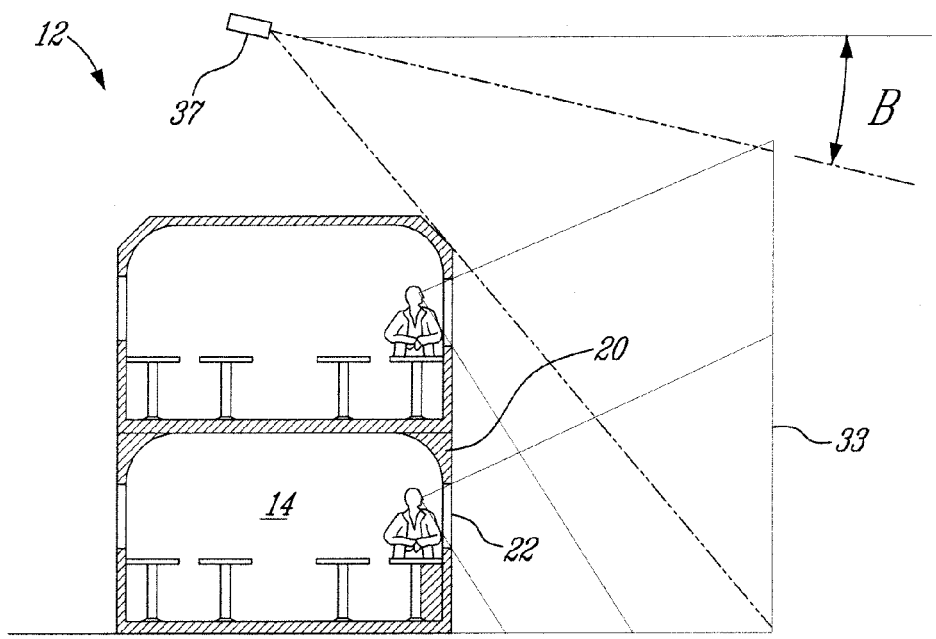
FIG_4

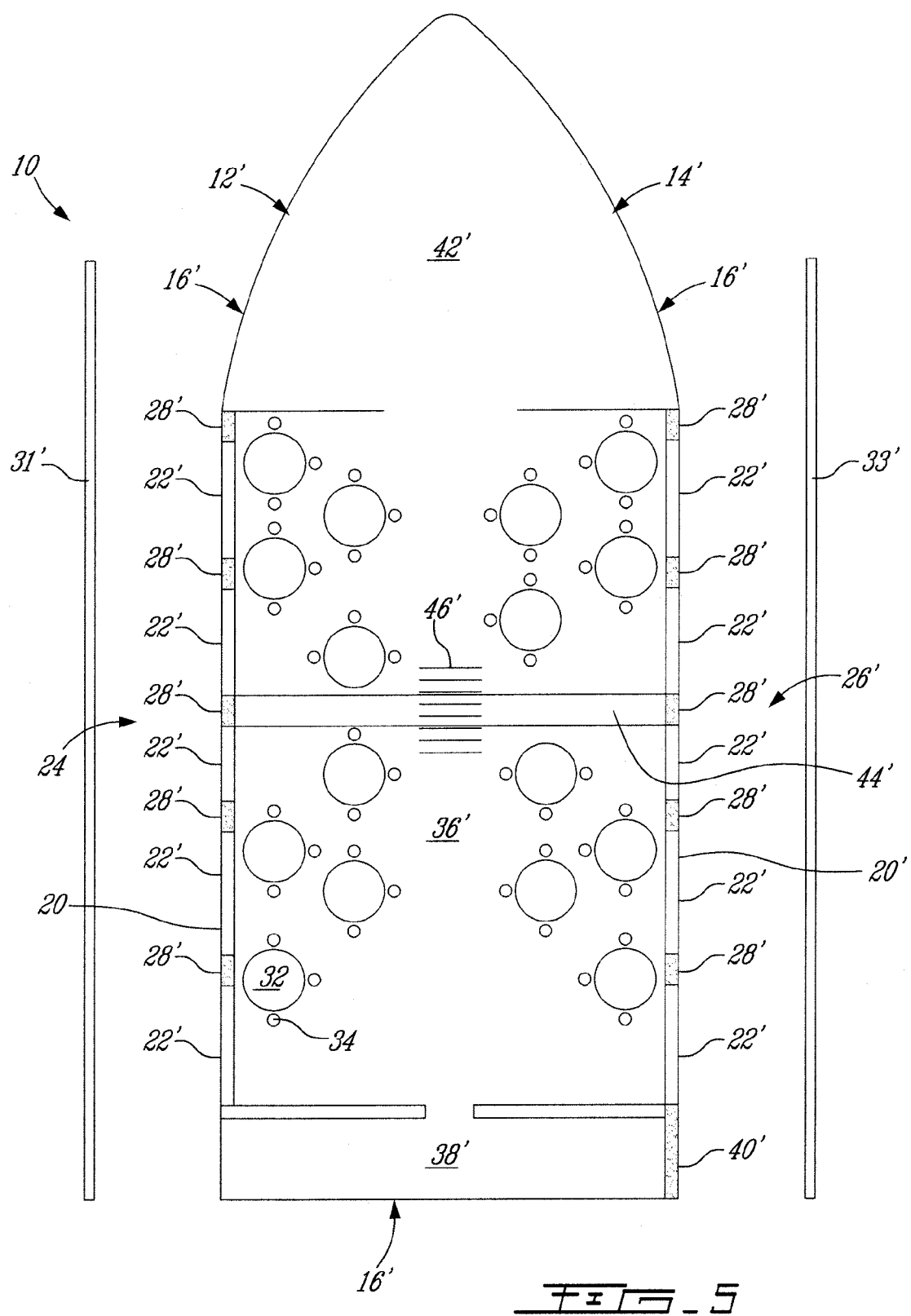
FIG_5

VIRTUAL ENVIRONMENT SIMULATING TRAVEL BY VARIOUS MODES OF TRANSPORTATION

CROSS-REFERENCE TO RELATED APPLICATIONS

This application claims priority on U.S. provisional patent application No. 60/986,308, filed on Nov. 8, 2007.

TECHNICAL FIELD

The present disclosure relates to a virtual environment, and more particularly, to a virtual environment simulating travel by various modes of transportation.

BACKGROUND ART

Presently, there is a considerable percentage of the population who choose not to travel for a number of reasons. For example, an individual may lack the monetary funds required to travel by train, plane, boat, etc. . . . Such a traveling experience can be costly and consequently unaffordable for some.

Furthermore, an individual may choose not travel because of their health condition. This is the case for many elderly people who fear being too far away from their doctors or from a hospital. In some instances, an individual with a heart condition may be advised by their doctor not to travel at all.

Still another reason deterring many from traveling is the numerous terrorist acts occurring globally. Now, it is common for people to think twice before stepping foot on plains, trains and the like for security reasons. Many chose to travel by public services less frequently and opt for driving instead.

Consequently, there is a need to provide a virtual environment simulating travel by various modes of transportation so that people who choose not to travel can still have an around the world experience at minimal costs. There is also a need to create such an environment in which each individual could enjoy a meal while experiencing a virtual ride.

SUMMARY OF THE INVENTION

It is therefore an aim of the present invention to provide a virtual environment simulating travel by various modes of transportation.

Therefore, in accordance with a general aspect of the present invention, there is provided a restaurant comprising a virtual reality environment simulating travel by a mode of transportation to allow individuals seating in the restaurant to have the impression of travelling while enjoying their meals, comprising: a dining room having first and second opposed facing side walls, said dining room being a re-creation of an interior environment of said mode of transportation, a first and a second series of windows respectively provided in said first and second opposed facing side walls, a table and seating arrangement disposed in said dining room for allowing individuals taking place at the table and seating arrangement to look through said first and second series of windows, first and second facing projection screens respectively disposed at a predetermined distance behind said first and second opposed facing side walls, first and second sets of projectors respectively projecting first and second series of continuous passing by images of a landscape on said first and second facing projecting screens, each of the projectors of a same set projecting a portion of a complete image projected on an associated one of said first and second facing projection screens, and a display control unit controlling said first and second sets of projectors and synchronizing the projection of said first and second series of passing by continuous images on the first and second facing projection screens in order to create an illusion of travel through the landscape by said mode of transportation when viewed through said first and second series of windows.

In accordance with another aspect, there is provided a virtual reality restaurant simulating travel by a mode of transportation comprising: a dining room circumscribed by walls, said dining room being a re-creation of an interior environment of the mode of transportation and having a seating arrangement for accommodating individuals, said dining room including a first series of adjacent windows and a second series of adjacent windows opposing said first series of adjacent windows, a first screen disposed outside of the dining room behind the first series of windows, the extent of the first screen being greater than the first series of windows, at least one projector for projecting a first seamless flow of continuous images of a first view of a landscape viewable through said first series of windows by individuals in the dining room, a second screen disposed outside of the dining room behind the second series of windows, the extent of the second screen being greater than the second series of windows, at least one other projector for projecting a second seamless flow of continuous images of a second view of the landscape viewable through said second series of windows by individuals in the dining room, and a control unit controlling said projectors such that said first and second seamless flows of passing by images create an illusion of travel through the landscape by said mode of transportation when looking at said first and second screens through said first and second series of windows.

In accordance with another aspect of the disclosure, there is provided a virtual reality restaurant simulating travel by a mode of transportation comprising: a dining room circumscribed by walls, said dining room being a re-creation of an interior environment of said mode of transportation and having a seating arrangement for accommodating individuals, said room including a first series of adjacent windows and a second series of adjacent windows opposing said first series of adjacent windows, a first series screen disposed behind said first series of adjacent windows and on which a first series of passing by continuous images of a first view of a landscape are successively displayed, a second screen disposed behind said second series of adjacent windows and on which a second series of continuous images of a second view of said landscape are successively displayed, said first and second series of passing by continuous images creating an illusion of travel through said landscape by said mode of transportation when viewed through said first and second series of adjacent windows.

In accordance with a further general aspect, there is provided a virtual reality restaurant simulating travel by a mode of transportation comprising: a room circumscribed by walls, said room being a re-creation of an interior environment of said mode of transportation having a seating arrangement for accommodating individuals, said room including a first series of adjacent windows and a second series of adjacent windows opposing said first series of adjacent windows, said first series of adjacent windows having a first series of screens on which a first series of passing by continuous images of a first view of a landscape are successively displayed from one screen to the next of said first series of screens, said second series of adjacent windows having a second series of screens on which said second series of continuous images of a second view of said landscape are successively displayed from one screen to the next of said second series of screens, said first and second series of passing by continuous images for viewing by said individuals creating an illusion of travel through said landscape by said mode of transportation.

In accordance with still a further general aspect, there is provided a virtual environment simulating a mode of transportation to create an illusion of travel for individuals comprising: at least a first wall and a second opposing wall, said first wall including a first series of windows and said second wall including a second series of windows, each of said first and second series of windows having a visual display means, said display means of said first series of windows successively displaying a first series of images of a scene, said display means of said second series of windows successively displaying a second series of images of said scene that are opposite perspective images of said first series of images.

BRIEF DESCRIPTION OF THE DRAWINGS

Reference will now be made to the accompanying drawings, wherein:

FIG. 2A is a side view showing an example of a landscape the passengers can see on the screens through the windows shown in FIG. 1;

FIG. 2B is another side view of the portion of the series of windows shown in FIG. 2A and showing what can be seen through the windows at another point in time;

FIG. 3 is a top plan view of the virtual reality restaurant illustrating the screen and projector arrangement on one side of the virtual reality restaurant;

FIG. 4 is a cross-sectional end view of the virtual reality restaurant; and

FIG. 5 is a top plan view of a virtual reality restaurant according to a second embodiment of the present invention;

DESCRIPTION OF THE PREFERRED EMBODIMENTS

Figure 1:
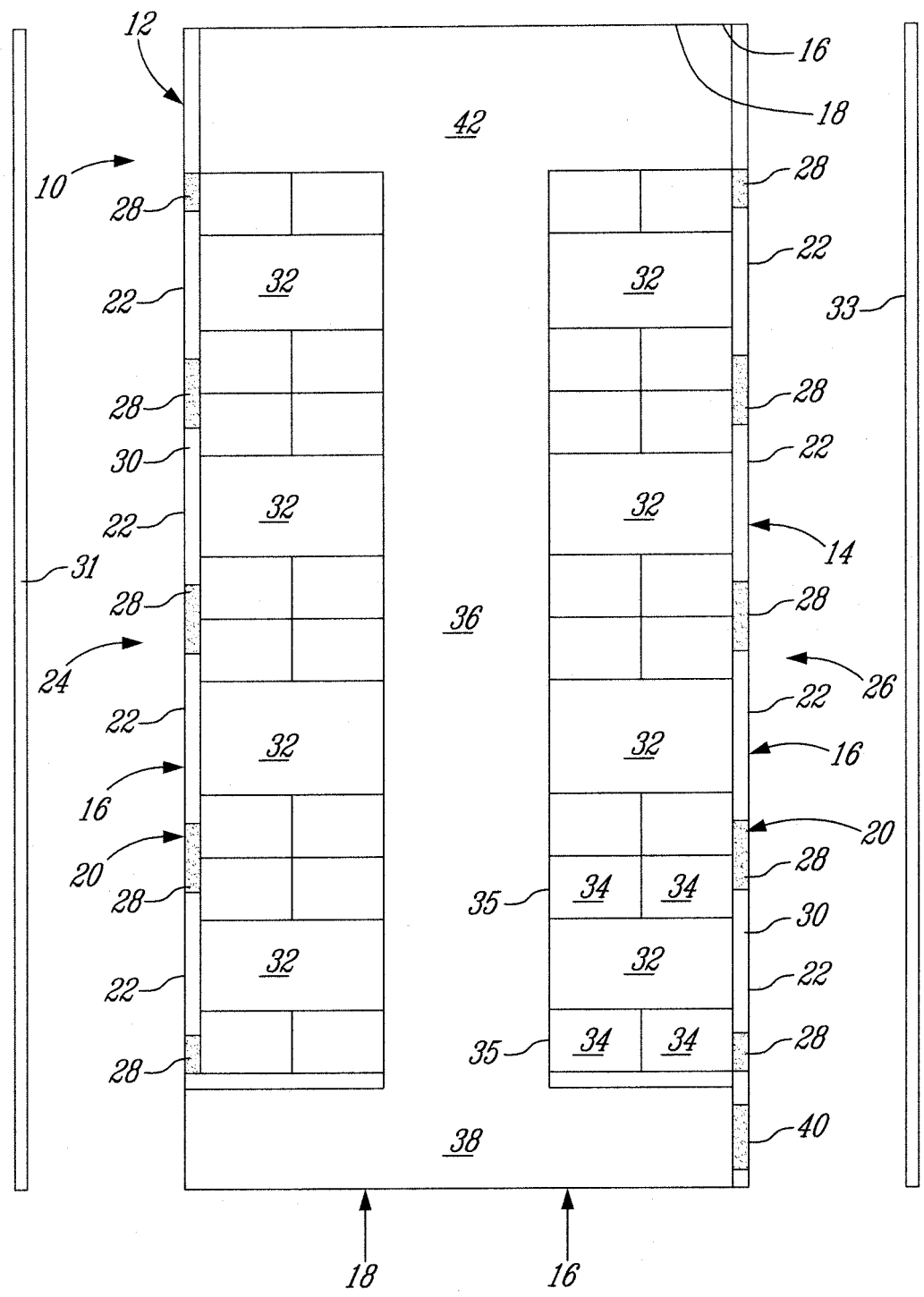
FIG. 1 is a schematic top view of a virtual reality restaurant including two series of windows and opposed facing outer screens according to a first embodiment of the present invention.

The invention will now be described based on embodiments which do not intend to limit the scope of the present invention but exemplify the invention. All of the features and the combinations thereof described in the embodiments are not necessarily essential to the invention.

Referring to all the Figures, a virtual environment 10 simulating travel by different modes of transportation is illustrated. This concept of a virtual reality environment can advantageously be integrated in a restaurant, allowing for people to enjoy a meal while having the illusion that they are traveling.

Particularly, FIG. 1 illustrates a virtual reality restaurant 12 simulating travel by train. The virtual reality restaurant 12 can be described as having a room 14 circumscribed by wall 16. The room 14 preferably has a rectangular shape so as to simulate a coach of a train. Hence, the room 14 may be specifically described as including a pair of shorter opposing end walls 18 flanked by a pair of longer opposing side walls 20.

In addition, the room 14 further includes a plurality of windows 22 disposed in the side walls 20. In order to simulate traveling by train in a coach, the windows 22 are preferably disposed in series along the pair of longer opposing side walls 20. Therefore, a first series of windows 24 are lined-up along one of the longer opposing side walls 20 and a second series of windows 26 are lined-up along the other of the longer opposing side walls 20. Furthermore, the windows 22 may be separated by curtains 28 as is characteristic of a conventional coach (FIG. 1).

The virtual reality restaurant 12 further includes a plurality of tables 32 and chairs 34 to accommodate a group of individuals. Preferably, the seating arrangement resembles that of a dining coach of a train with the tables 32 and chairs 34 adjacent the pair of longer opposed walls 20 such that a corridor 36 is defined therebetween.

Notably, each table 32 is placed against a longer opposing side wall 20 and centered with respect to a window 22. The chairs 34 in this case are of the type commonly found in a dining coach. One possible example of a type of chair 34 employed in the present embodiment is a high-back bench 35 that can accommodate more than one individual. As illustrated in FIG. 1, a table 32 is placed between two high-back benches 35, the latter also adjacent the longer opposing wall 20.

Still further, the virtual reality restaurant 12 may also include a customer reception area 38 with a doorway 40 as well as a service area 42 including a kitchen and toilettes. It should be understood that although the reception area 38 and service area 42 are shown as being at far ends of the room 14, the virtual reality restaurant 12 can be designed many different ways and still resemble a dining coach of a train.

The windows 22 each have a sheet of glass 30 or the like through which the individuals taking place at the tables 32 can looked through while enjoying their meals. As shown in FIG. 1, first and second projection screens 31 and 33 are disposed on opposed longitudinal sides of the virtual reality restaurant 12 outside of the room 14 in parallel to and at distance from the opposing side walls 22. As can be appreciated from FIGS. 2a and 2b, images can be displayed on the screens 2a and 2b so that a person in the room 14 looking through the windows 22 at the screens 31 and 33 has the illusion that a landscape is passing by entirely as if the person were actually traveling in the reproduced environment by train.

The screens 31 and 33 may be similar to the front projection screens commonly used in theatres. However, it is understood that any type of suitable screens could be used as well. The ends of the screens 31 and 33 are preferably curved in order to improve the vanishing point when looking at an image on the screens 31 and 33.

As shown in FIGS. 3 and 4 in connection with screen 33, a number of front projectors 37 (three in the illustrated examples) can be used to project an image on screen 33. A similar projecting arrangement is provided for screen 31 and thus the duplicate description thereof will be omitted for brevity. The number of projectors 37 can vary as a function of the size of the screen and the distance from the screen. By dividing the image to be projected in image portions and projecting each image portion with a dedicated projector to form back a complete image on the screen, the projecting distance (i.e. distance between the screen and the projector) can advantageously be reduced without compromising the quality of the projected image. For instance, the applicant has found that satisfactory results can be obtained by using three projectors 37 positioned at about 19 feet from a 60 feet wide by 18 feet high screen. As mentioned herein above, each projector 37 projects a portion of the complete image. Accordingly, if three projectors are used, the image is separated in three portions, each projector projecting one of the portions of the complete image. As shown in FIG. 3, the projectors 37 are disposed such that their respective adjacent light beams overlap on the screen 33 in areas 39. In the overlapping areas 39, the adjacent projectors 37 project the exact same image portions and these image portions are projected such as to be perfectly superposed one over the other. In other words, the end of the image portion projected by a first projector 37 and the beginning of the image portion projected by the next adjacent projector 37 are identical and superimposed on the screen 33. This provides for the projection of a continuous image wherein the portions of the complete image projected by adjacent projectors 37 blend into each other so that it is not possible for a viewer to perceive a separation or discontinuity between the projected image portions. This provides for a seamless re-composed image on the screen.

As shown in FIG. 4, the projectors 37 can be mounted to an overhead structure above the roof of the train reproduction so as to not be visible for the individual/passengers in the room 14. The projectors 37 are tilted downwardly by an angle β sufficient to ensure that the image be projected on the full height of the screen that is from the bottom to the top of the screen 33. According to one example, the projectors 37 are located at about 23 feet from floor level, at about 19 feet from a 60'×18' screen and are angled by about 13 degrees downwardly from the horizontal. As shown in FIG. 4, the sides of the roof of the train reproduction can be bevelled in order not to interfere with the projection of the image on the screen. Also, the size of the windows and the distance of the screen from the sidewall of the must be selected such that the field of vision of the individuals seating inside the virtual reality restaurant 12 do not extend beyond the screen 33 as schematically represented in FIG. 4. Accordingly, the screens 31 and 33 must be sufficiently close to the side walls 22 (e.g. 12 feet) and of greater dimensions than the side walls 22 (e.g. 27'×14' sidewalls for a 60'×18' screen) to ensure that the viewers do not see the outline of the screens. The person skilled in that art will understand that various relative dimensions can be used to achieve that goal.

Suitable examples of projectors are the 5000 to 7000 lumens projectors equipped with a 0.8 lens. The resolution of the projectors 37 is preferably at least of 1400×1050. Also, while the above screen and projector arrangement as been described as a front projection arrangement, it is understood that rear projection arrangements are also feasible.

A control unit 41 is provided for controlling the projectors 37 and synchronising the projection of the image portions on the screens 31 and 33. According to one embodiment, the control unit 41 could comprise one computer for each projector 37, the computers communicating with each other and having a watchout system, such as the one produced by Dataton, a Swedish software development company, in order to provide for the simultaneous projection of video images on the screens with seamless junction of the video images projected by the adjacent projectors 37. Any other suitable synchronizing system providing for the projection of seamless passing by images could be used as well. The images are preferably projected from at least a HD 1920×1080 pixels film separated in a number of image portions corresponding to the number of projectors used. A film shut in 16 mm or 36 mm would provide for a better resolution but would be more expensive. A 4 k video camera could also be used to shoot the films to be projected on the screens 31 and 33. Any other high resolution camera or devices could be used to shoot the images of the landscape that the passenger of the train would see if they were really travelling in the virtually reproduced environment. For instance, if it is desired to simulate a trip in Italy, the film will be shot in Italy to capture typical images of the landscape of this country. The film is shut in movement to see the selected landscape as a flow of continuous images just as a viewer would see while taking place in a vehicle which is in movement. Once the desired images of a representative destination has been filmed, it is digitized and uploaded in the computers before being divided in image portions as described above.

In use, the continuous flow of images projected on the screens 31 and 33 will give the impression to the individuals seating at the tables 32 in the virtual reality restaurant 12 that the train reproduction is moving in a forward direction F due to the flow of successive images passing by in front of the windows 24. For instance, as shown in FIGS. 2a and 2b, a first series of continuous images of a landscape would pass by in the first series of windows 24. Images A and B are successively visible through adjacent windows 24: from one window to the next and so on for the remaining windows 24 of the first series (not shown).

Similarly, a second series of continuous images of the same landscape that are opposite perspective images of the first series of continuous images pass by the windows of the second series of windows 26. Due to the coherence and unity of the image portions projected on the screens 31 and 33 behind the windows 24 and 26, a person within the virtual environment 10 will be under the impression that they are traveling in a forward direction F, as indicated in FIGS. 2A and 2B.

For example, a person seated within the confines of the pair of longer opposing walls 20 of the virtual reality restaurant 12 will see a first view of a landscape passing by in the first series of windows and will see a second view of the same landscape passing by in the second series of windows. The first and second views of the landscape differ, yet the differing views give the person the impression that they are traveling forward through the landscape.

Now referring to FIG. 5, a second embodiment of a virtual environment 10 integrated in a restaurant simulating travel by boat is illustrated. Essentially, the second embodiment encompasses the exact same elements mentioned in the first embodiment only varying in design; therefore corresponding elements have been identified with similar reference numerals (ex. 12 and 12').

A first design variation of the second embodiment is that the room 14' includes two walls 16' that converge so as to resemble the front of a boat (FIG. 3). Nevertheless, the concept of having windows 22' disposed in a pair of longer opposing walls 20' remains the same.

A second design variation is the shape and style of the tables 32' and the chairs 34' in the second embodiment, which is preferably coherent with that of a typical boat dining room. Notably, a corridor 36' is still defined between the tables 32' and the chairs 34' that are adjacent the longer opposing walls 20' of the room 14'.

In addition, the virtual reality restaurant 12' of the second embodiment illustrated in FIG. 5 includes some additional features that were not identified for the first embodiment but that can also be applicable thereto. For example, a partitioning wall 44' is included dividing the room 14' into sections so as to be able to offer customers a choice of trips. Possibly, in one section of the virtual reality restaurant 12' customers can enjoy a meal while traveling along the French Riviera while in another section of the room 14' customers can have the illusion that they are traveling along the coast of Southern Spain. Furthermore, the rooms 14 and 14' as described in the present description can be extended to include multiple floors (see for instance FIG. 4) for accommodating a greater number of individuals. This is illustrated in FIG. 5 by the inclusion of stairs 46' leading to the next flour.

At this point it should be stated that the virtual environment can advantageously simulate travel through any desired location; hence displaying images of landscape of the chosen location that suit the chosen mode of transportation.

Moreover, the virtual environment may also include an audio system for generating sound. For example, in the first embodiment wherein travel by train is simulated, including an audio system to emit sounds characteristic of a train, such as a conductor's voice announcing the next stop; can advantageously make the experience for an individual more realistic. A mechanical or acoustic system can be provided to cause the floor to vibrate in order to enhance the impression of movement.

In addition, a mechanical floor may also be included as part of the virtual environment so as to generate vibrations that an individual may feel if they were actually traveling by said mode of transportation. This could be accomplished by a mechanical or acoustic system linked to the control unit 41.

The display control unit 41 may also process audio data through a network and generates sounds to be outputted to speakers.

Furthermore, the image that is delivered to a screen or display may also be a stereoscopic image suitable for generating a three-dimensional effect. Thus, the screen or display means must also be suitable for receiving the image and creating the effect. Therefore, the image that an individual sees may appear to change in perspective as the individual changes position, thus adding to the realism of the virtual environment.

At this point, it should be stated that the concept of a virtual environment simulating travel described herein includes many additional embodiments representing modes of transportation that were not introduced. As above-mentioned this concept can be integrated in a restaurant, bar or cafe setting, but of course it should be understood that the present invention extends to any relevant setting. Furthermore, LCD screens or other projector-less technologies could be used to display the passing by images.

The invention claimed is:

1. A restaurant comprising a virtual reality environment simulating travel by a mode of transportation to allow individuals seating in the restaurant to have an impression of travelling while enjoying their meals, comprising: a dining room bounded by first and second opposed facing side walls, said dining room being a re-creation of an interior environment of said mode of transportation, a first and a second series of windows respectively provided in said first and second opposed facing side walls, a table and seating arrangement disposed in said dining room for allowing individuals taking place at the table and seating arrangement to look through said first and second series of windows, first and second facing projection screens hidden behind said first and second side walls and disposed outside of the dining room at a predetermined distance behind said first and second opposed facing side walls, respectively, all the windows of said first series being disposed in front of said first projection screen such that a viewer looking through any one of said windows of said first series from within the dining room is looking at said first projection screen, all the windows of said second series being disposed in front of said second projection screen such that the viewer looking through any one of said windows of said second series from within the dining room is looking at said second projection screen, there being provided only one screen per series of windows, the first and second opposed facing side walls having wall sections between adjacent windows of said first and second series of windows, respectively, said wall sections hiding corresponding portions of the first and second projection screens located therebehind, the first and second projection screens being disposed in direct opposed facing relationship, first and second sets of projectors respectively projecting first and second series of continuous passing by images of a landscape on said first and second facing projecting screens, each of the projectors of a same set projecting a portion of a complete image projected on an associated one of said first and second facing projection screens, and a display control unit controlling said first and second sets of projectors and synchronizing the projection of said first and second series of passing by continuous images on the first and second facing projection screens in order to create an illusion of travel through the landscape by said mode of transportation when viewed through said first and second series of windows, wherein each projector of the first and second set of projectors project a beam of light, and wherein the beams of light of adjacent projectors of the first and second sets of projectors respectively overlap in respective overlapping areas on the first and second facing projection screens, and wherein in the overlapping areas, the adjacent projectors project the same image.

2. The restaurant defined in claim 1, wherein said first and second set of projectors are mounted outside of the dining room.

3. The restaurant defined in claim 2, wherein said first and second series of projectors are mounted directly above said dining room, and titled forwardly downwardly.

4. The restaurant defined in claim 1, wherein the first and second projection screens are wider and taller than the first and second opposed facing side walls.

5. The restaurant defined in claim 1, wherein said dining room has a floor vibrating system for simulating vibrations characteristic to said mode of transportation.

6. The restaurant defined in claim 5, wherein said room further includes an audio system.

7. The virtual environment of claim 1, wherein said mode of transportation is a train.

8. The virtual environment of claim 1, wherein said mode of transportation is a boat.

9. A virtual reality restaurant simulating travel by a mode of transportation comprising: a dining room circumscribed by walls, said dining room being a re-creation of an interior environment of the mode of transportation and having a seating arrangement for accommodating individuals, said dining room including a first series of adjacent windows and a second series of adjacent windows opposing said first series of adjacent windows, a first screen disposed outside of the dining room behind the first series of windows, the extent of the first screen being greater than the first series of windows, a first set of projectors for projecting a first seamless flow of continuous images of a first view of a landscape on said first screen, the images being viewable through said first series of windows by individuals in the dining room, a second screen disposed outside of the dining room behind the second series of windows, the extent of the second screen being greater than the second series of windows, a second set of projectors for projecting a second seamless flow of continuous images of a second view of the landscape on said second screen, the images being viewable through said second series of windows by individuals in the dining room, and a control unit controlling said projectors such that said first and second seamless flows of passing by images create an illusion of travel through the landscape by said mode of transportation when looking at said first and second screens through said first and second series of windows, wherein adjacent projectors of a same set are disposed to have overlapping beams of light, each overlapping area including a superposition of a same image.

10. The restaurant defined in claim 9, wherein the projectors are mounted directly above said dining room.

11. The restaurant defined in claim 9, wherein said dining room has a floor vibrating system for simulating vibrations characteristic to said mode of transportation.

12. The restaurant defined in claim 9, wherein said room further includes an audio system, the control unit also controlling the audio system.

13. The virtual environment of claim 9, wherein said mode of transportation is selected from a group consisting of a train and a boat.

* * * * *